(12) United States Patent
Uchino et al.

(10) Patent No.: US 11,974,340 B2
(45) Date of Patent: Apr. 30, 2024

(54) USER EQUIPMENT AND RADIO BASE STATION

(71) Applicant: NTT DOCOMO, INC., Tokyo (JP)

(72) Inventors: Tooru Uchino, Tokyo (JP); Hideaki Takahashi, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/053,210

(22) PCT Filed: May 9, 2018

(86) PCT No.: PCT/JP2018/018021
§ 371 (c)(1),
(2) Date: Nov. 5, 2020

(87) PCT Pub. No.: WO2019/215860
PCT Pub. Date: Nov. 14, 2019

(65) Prior Publication Data
US 2021/0235527 A1    Jul. 29, 2021

(51) Int. Cl.
*H04W 76/15*     (2018.01)
*H04W 52/36*     (2009.01)

(52) U.S. Cl.
CPC ......... *H04W 76/15* (2018.02); *H04W 52/365* (2013.01)

(58) Field of Classification Search
CPC .................................................. H04W 52/365
See application file for complete search history.

(56) References Cited

U.S. PATENT DOCUMENTS

| 9,451,564 | B2 | 9/2016 | Kim et al. |
| 9,510,305 | B2 | 11/2016 | Kim et al. |
| 9,615,338 | B2 | 4/2017 | Kim et al. |
| 9,756,583 | B2 | 9/2017 | Hwang et al. |
| 9,918,286 | B2 | 3/2018 | Hwang et al. |
| 10,098,076 | B2 | 10/2018 | Kim et al. |
| 10,154,465 | B2 | 12/2018 | Hwang et al. |
| 10,575,265 | B2 | 2/2020 | Kim et al. |
| 2012/0207112 | A1 | 8/2012 | Kim et al. |

(Continued)

FOREIGN PATENT DOCUMENTS

| JP | 2016-213518 A | 12/2016 |
| JP | 2016-213894 A | 12/2016 |
| JP | 2017-515367 A | 6/2017 |

OTHER PUBLICATIONS

International Search Report for corresponding International Application No. PCT/JP2018/018021, dated Jul. 10, 2018 (10 pages).

(Continued)

*Primary Examiner* — James P Duffy
(74) *Attorney, Agent, or Firm* — Osha Bergman Watanabe & Burton LLP (57) ABSTRACT

UE (200) executes dual connectivity in which it simultaneously connects to a radio base station and other radio base station. The UE (200) includes a transmitting unit (210) that transmits to the radio base station and the other radio base station uplink transmission related information indicating an uplink transmission state, and a control unit (230) that controls transmission or stop of transmission of the uplink transmission related information of a predetermined type.

1 Claim, 5 Drawing Sheets

(56) References Cited

U.S. PATENT DOCUMENTS

| | | | |
|---|---|---|---|
| 2015/0189605 A1 | 7/2015 | Kim et al. | |
| 2015/0189606 A1 | 7/2015 | Kim et al. | |
| 2016/0029235 A1 | 1/2016 | Kim et al. | |
| 2017/0019864 A1 | 1/2017 | Hwang et al. | |
| 2017/0208556 A1 | 7/2017 | Kim et al. | |
| 2017/0325181 A1 | 11/2017 | Hwang et al. | |
| 2018/0152901 A1 | 5/2018 | Hwang et al. | |
| 2018/0310259 A1 | 10/2018 | Kim et al. | |
| 2018/0324714 A1* | 11/2018 | Yang | H04W 52/367 |
| 2019/0082397 A1 | 3/2019 | Hwang et al. | |
| 2020/0245264 A1* | 7/2020 | Iwai | H04W 52/325 |

OTHER PUBLICATIONS

Written Opinion for corresponding International Application No. PCT/JP2018/018021, dated Jul. 10, 2018 (6 pages).
Huawei, HiSilicon; "PHR report"; 3GPP TSG-RAN WG2 Meeting #98, R2-1705203; Hangzhou, China; May 15-19, 2017 (2 pages).
3GPP TS 38.213 V15.1.0; "3rd Generation Partnership Project; Technical Specification Group Radio Access Network; NR; Physical layer procedures for control (Release 15)"; Mar. 2018 (82 pages).
Extended European Search Report issued in counterpart European Patent Application No. 18917724.9, dated Nov. 22, 2021 (10 pages).
Office Action issued in the counterpart Japanese Patent Application No. 2020-517688, dated Jan. 11, 2022 (6 pages).
Ericsson; "Power Headroom Reporting in Dual Connectivity"; 3GPP TSG-RAN WG2 #87bis, Tdoc R2-144195; Shanghai, China, Oct. 6-10, 2014 (8 pages).
Intel Corporation; "PHR for Dual Connectivity"; 3GPP TSG-RAN2 Meeting #85, R2-140283; Prague, Czech Republic, Feb. 10-14, 2014 (3 pages).
Samsung; "Support of Type 2 PH in NR"; 3GPP TSG-RAN WG2 NR Ad Hoc, R2-1800614; Vancouver, BC, Canada, Jan. 22-26, 2018 (5 pages).
Samsung; "PHR format for NR"; 3GPP TSG-RAN WG2 Meeting #99bis, R2-1710954; Prague, Czech Republic, Oct. 9-13, 2017 (6 pages).
Office Action issued in the counterpart Japanese Patent Application No. 2020-517688, dated Apr. 21, 2022 (6 pages).
Samsung, "NSA PHR for EN-DC (LTE-NR DC)", 3GPP TSG-RAN WG2 Meeting #98, R2-1705604, Hangzhou, China, May 15-19, 2017 (4 pages).
Office Action in the counterpart Chinese Application No. 201880093112.2, dated May 16, 2023 (19 pages).
Office Action issued in the counterpart Chinese Application No. 201880093112.2, mailed Oct. 12, 2023 (11 pages).
Office Action issued in the counterpart Mexican Application No. MX/a/2020/011824, mailed Nov. 14, 2023 (6 pages).

* cited by examiner

USER EQUIPMENT AND RADIO BASE STATION

TECHNICAL FIELD

The present invention relates to a user equipment and a radio base station for performing radio communication, and relates more particularly to a user equipment and a radio base station that support dual connectivity.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

In the NR, two types of calculation methods for power headroom (PH) are stipulated. Specifically, Type 1 and Type 3 are defined (see Patent Document 1).

The Type 1 is for PUSCH (Physical Uplink Shared Channel), and the Type 3 is for SRS (Sounding Reference Signal). That is, in a cell for which PUSCH transmission is not set, PH is calculated based on the Type 3 and PHR (Power Headroom Report) is transmitted.

Also, in the case of dual connectivity (DC), e.g., EN-DC (E-UTRA-NR Dual Connectivity), in which a user equipment (UE) simultaneously connects to a plurality of radio base stations, the UE, in all serving cells, sends the PHR to each of the radio base stations (eNB and gNB). As a result, the eNB and the gNB can recognize transmission power situation in uplink (UL), and can adjust the UL transmission power under its own station, determine the transmission direction of the UL data at the time of setting the split bearer, and determine the DC deletion.

PRIOR ART DOCUMENT

Non-Patent Document

Non-Patent Document 1: 3GPP TS 38.213 V15.1.0, 3rd Generation Partnership Project; Technical Specification Group Radio Access Network; NR; Physical layer procedures for control (Release 15), 3GPP, March 2018

SUMMARY OF THE INVENTION

In the case of the dual connectivity (DC), in order to accurately recognize the transmission power situation in the UL described above, it is necessary that each of the radio base stations is aware of, for all the serving cells that are target of the DC, which PH between the Type 1 and the Type 3 has been applied.

Therefore, it is necessary for each of the radio base stations to acquire setting information, when the DC has been set, of other radio base station from time to time. However, this situation leads to a decrease in interoperability between radio base stations.

The present invention has been made in view of the above discussion. One object of the present invention to provide a user equipment and a radio base station in which, in dual connectivity (DC), the radio base station is capable of recognizing uplink transmission related information such as power headroom (PH) in all serving cells while preventing degradation of interoperability between radio base stations.

A user equipment according to one aspect of the present invention is a user equipment (UE 200) that performs radio communication with a radio base station (e.g., eNB 100A) and supports dual connectivity in which the user equipment simultaneously connects to the radio base station and other radio base station (gNB 100B) . The user equipment includes a transmitting unit (transmitting unit 210) that transmits to the radio base station and the other radio base station uplink transmission related information (e.g., PH Type) indicating an uplink transmission state; and a control unit (control unit 230) that controls transmission or stop of transmission of the uplink transmission related information of a predetermined type.

A radio base station according to another aspect of the present invention is a radio base station (e.g., eNB 100A) that performs radio communication with a user equipment (UE 200). The user equipment supports dual connectivity in which the user equipment simultaneously connects to the radio base station and other radio base station. The radio base station includes a control unit (control unit 130) that sets uplink transmission related information indicating an uplink transmission state between the user equipment and the radio base station; and a transmitting unit (transmitting unit 110) that transmits information used for setting the uplink transmission related information to the other radio base station with which the dual connectivity is performed.

MODES FOR CARRYING OUT THE INVENTION

Exemplary embodiments of the present invention will be explained with reference to the drawings. Note that, the same or similar reference numerals have been attached to the same functions and configurations, and the description thereof is appropriately omitted.

(1) Overall Schematic Configuration of Radio Communication System

Figure 1:
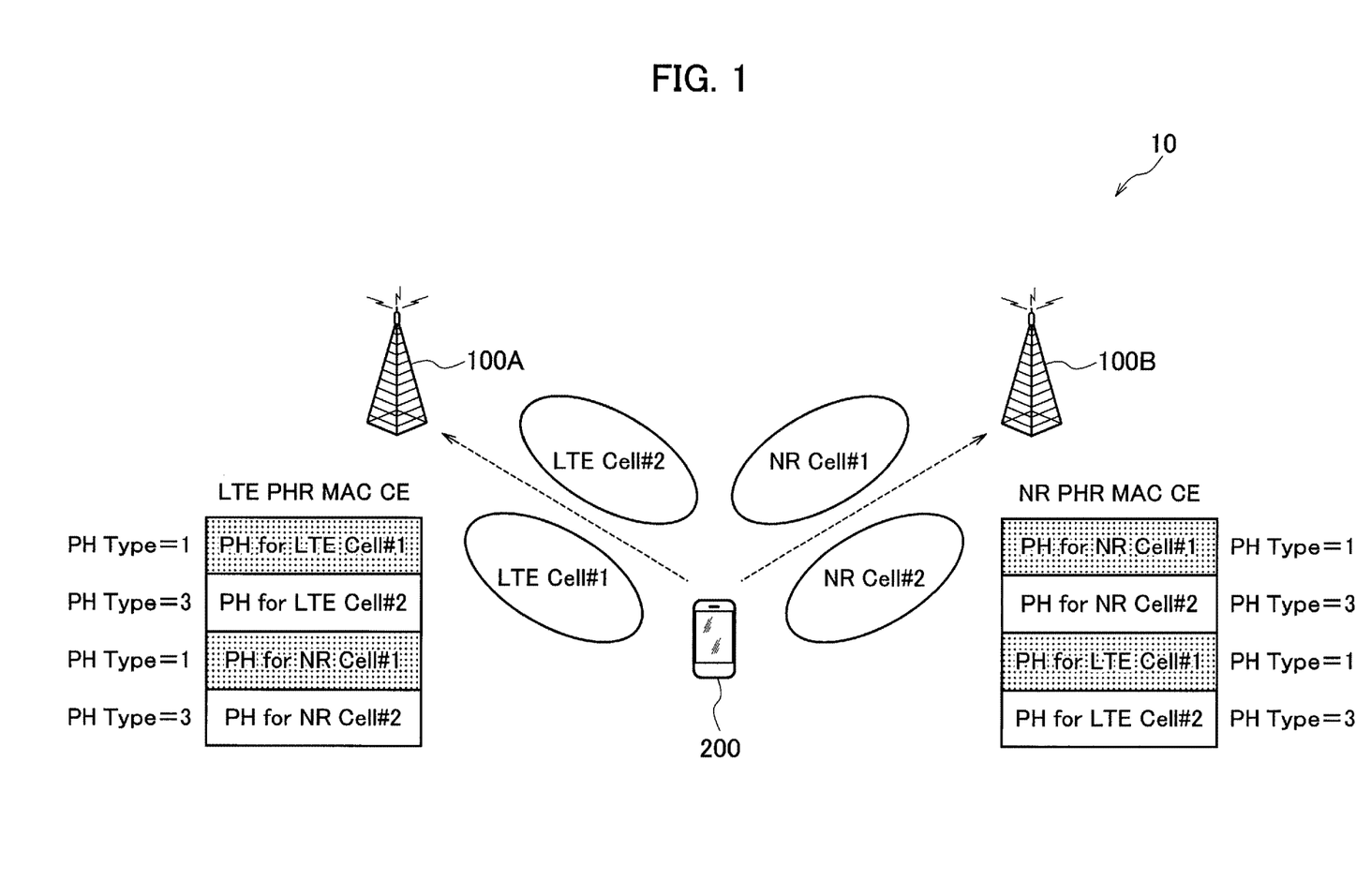
FIG. 1 is an overall schematic configuration diagram of a radio communication system 10.

FIG. 1 is an overall schematic configuration diagram of a radio communication system 10 according to the present embodiment. The radio communication system 10 includes a radio base station 100A (hereinafter, "eNB 100A"), a radio base station 100B (hereinafter, "gNB 100B"), and a user equipment 200 (hereinafter, "UE 200").

The radio communication system 10 is a radio communication system according to Long Term Evolution (LTE) and 5G New Radio (NR). Note that, the LTE may be referred to as 4G, and the NR may be referred to as 5G.

The eNB 100A is a radio base station of the LTE system. The gNB 100B is a radio base station of the NR system.

The UE 200 performs radio communication with the eNB 100A and the gNB 100B. Specifically, the UE 200 performs the radio communication with the eNB 100A according to the LTE system and performs the radio communication with the gNB 100B according to the NR system. Particularly, in the present embodiment, the UE 200 can perform dual connectivity (DC) in which it can simultaneously connect to both the eNB 100A and the gNB 100B.

The eNB 100A can configure, at the time of setting dual connectivity, a plurality of serving cells (LTE cells #1 and #2). Similarly, the gNB 100B can configure, at the time of setting dual connectivity, a plurality of serving cells (NR cells #1 and #2).

When setting the dual connectivity, the UE 200 can transmit uplink transmission related information that indicates a transmission state of uplink (UL), concretely PHR (Power Headroom Report), to the eNB 100A and the gNB 100B.

More specifically, as shown in FIG. 1, the UE 200 transmits, by using MAC-CE (Medium Access Control-Control Element) of LTE, PHRs of all the serving cells (LTE cells #1 and #2, and NR cells #1 and #2) to the eNB 100A. Similarly, the UE 200 transmits, by using MAC-CE of NR, the PHRs of all the serving cells (LTE cells #1 and #2 and NR cells #1 and #2) to the gNB 100B.

In the present embodiment, the Type 1 power headroom (PH) is used for the LTE cell #1 and the NR cell #1. On the other hand, the Type 3 PH is used in the LTE cell #2 and the NR cell #2. That is, PUSCH (Physical Uplink Shared Channel) is set in the LTE cell #1 and the NR cell #1.

The Type 1 PH and the Type 3 PH are as specified in 3GPP TS 38.213. The PH is the difference between a maximum transmission power of a wireless transmitting/receiving unit (WTRU) and an estimated transmission power for PUSCH transmission in the current subframe (or slot, minislot).

(2) Functional Block Configuration of Radio Communication System

Figure 2:
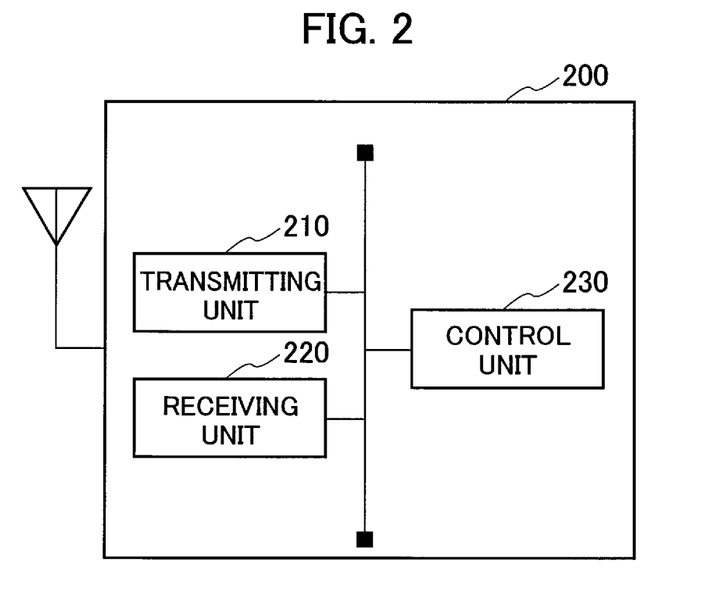
FIG. 2 is a functional block diagram of the UE 200.
Figure 3:
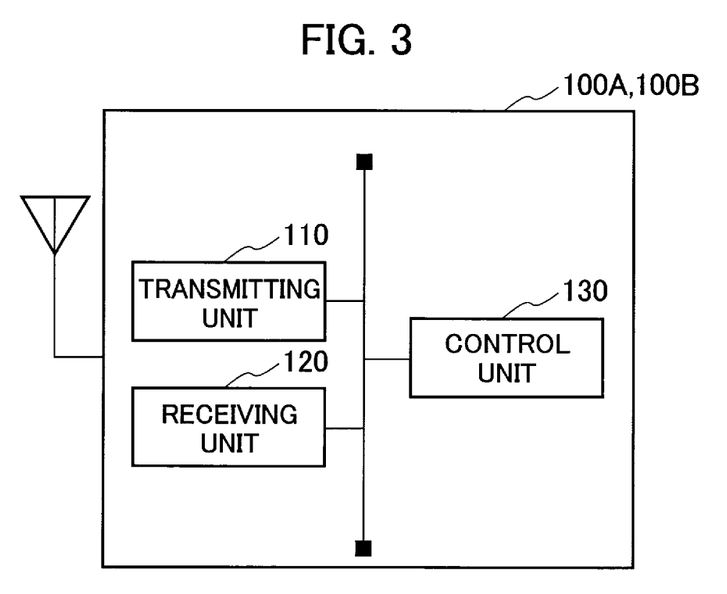
FIG. 3 is a functional block diagram of eNB 100A.

A functional block configuration of the radio communication system 10 will be explained below. Concretely, a functional block configuration of each of the eNB 100A (gNB 100B) and the UE 200 will be explained. For convenience of explanation, the UE 200 will be explained first.

(2.1) UE 200

FIG. 2 is a functional block diagram of the UE 200. As shown in FIG. 2, the UE 200 includes a transmitting unit 210, a receiving unit 220, and a control unit 230.

The transmitting unit 210 transmits UL signal according to LTE or NR. Particularly, in the present embodiment, the transmitting unit 210 transmits to the eNB 100A and the gNB 100B the uplink transmission related information that indicates a transmission state of UL.

Concretely, the transmitting unit 210 transmits, as an example of the uplink transmission related information, power headroom (PH) to the eNB 100A and the gNB 100B. More specifically, the transmitting unit 210 transmits, by using the MAC-CE, a PH value and a type (Type 1 or Type 3) of each serving cell. The configuration of the MAC-CE is specified in 3GPP TS 36.321 (LTE) and 3GPP TS 38.321 (NR).

The receiving unit 220 receives a downlink signal (DL signal) according to the LTE or the NR. Particularly, in the present embodiment, the receiving unit 220 receives an indication from the eNB 100A (or the gNB 100B, and this applies in the below explanation) indicating a predetermined type of the uplink transmission related information.

Specifically, the receiving unit 220 receives from the eNB 100A an instruction indicating the type (Type) of the PH for which the transmission is to be performed (ON) or stopped (OFF). The indication method is not particularly limited. The type of PH that is to be turned on may be specified, or the type of PH to be turned off may be specified. Further, as will be explained later, such an instruction is not necessary.

The control unit 230 performs control on the UL signal transmitted by the transmitting unit 210 and the DL signal received by the receiving unit 220.

Particularly, in the present embodiment, the control unit 230 controls the transmission or the stop of transmission of the uplink transmission related information of a predetermined type (Type 1 or Type 3).

Specifically, the control unit 230 controls the transmission or the stop of transmission of a report of power headroom that is the difference between the maximum transmission power and the transmission power of the physical uplink shared channel (PUSCH).

More specifically, the control unit 230 controls the transmission or the stop transmission of the PHR of the serving cells (LTE cells #1 and #2 and NR cells #1 and #2).

Moreover, the control unit 230 controls the transmission or the stop of transmission of the PHR based on the predetermined type (Type 1 or Type 3) received from the eNB 100A.

(2.2) eNB 100A

FIG. 3 is a functional block diagram of the eNB 100A. As shown in FIG. 3, the eNB 100A includes a transmitting unit 110, a receiving unit 120, and a control unit 130. Note that, the gNB 100B also has substantially the same configuration as the eNB 100A except that the communication method is different.

The transmitting unit 110 transmits the DL signal according to the LTE. Particularly, in the present embodiment, the transmitting unit 110 transmits, to the gNB 100B (other radio base station) that performs the dual connectivity, the information used for setting the uplink transmission related information.

Specifically, the transmitting unit 110 transmits the information used for setting the uplink transmission related information to the gNB 100B for the serving cell serving as the target of performing the dual connectivity.

More specifically, the transmitting unit 110 notifies the gNB 100B of information necessary for determining the PH type (Type 1 or Type 3). For notifying this information, signaling via X2 interface, inter-node message (Inter-node message), or the like can be used. Alternatively, this information can be notified via a core network (not-shown), or the UE 200.

The receiving unit 120 receives the UL signal according to the LTE. Particularly, in the present embodiment, the receiving unit 220 receives from the UE 200 the uplink transmission related information such as the PHR.

The control unit 130 executes control on the DL signal transmitted by the transmitting unit 110 and the UL signal received by the receiving unit 220.

Particularly, in the present embodiment, the control unit 130 sets the uplink transmission related information that indicates UL transmission state between the UE 200 and the eNB 100A.

Specifically, the control unit 130 determines the type of PH to be applied (Type 1 or Type 3) and the like based on the setting state of the PUSCH and the like. As explained above, the Type 1 is for the PUSCH and the Type 3 is for the SRS (Sounding Reference Signal). That is, the Type 3 is set in a cell for which the PUSCH transmission is not set.

(3) Operation of Radio Communication System

An operation of the radio communication system 10 will be explained below. Specifically, the operation relating to the report (PHR) of the power headroom (PH) will be explained.

(3.1) Operation Example 1

Figure 4:
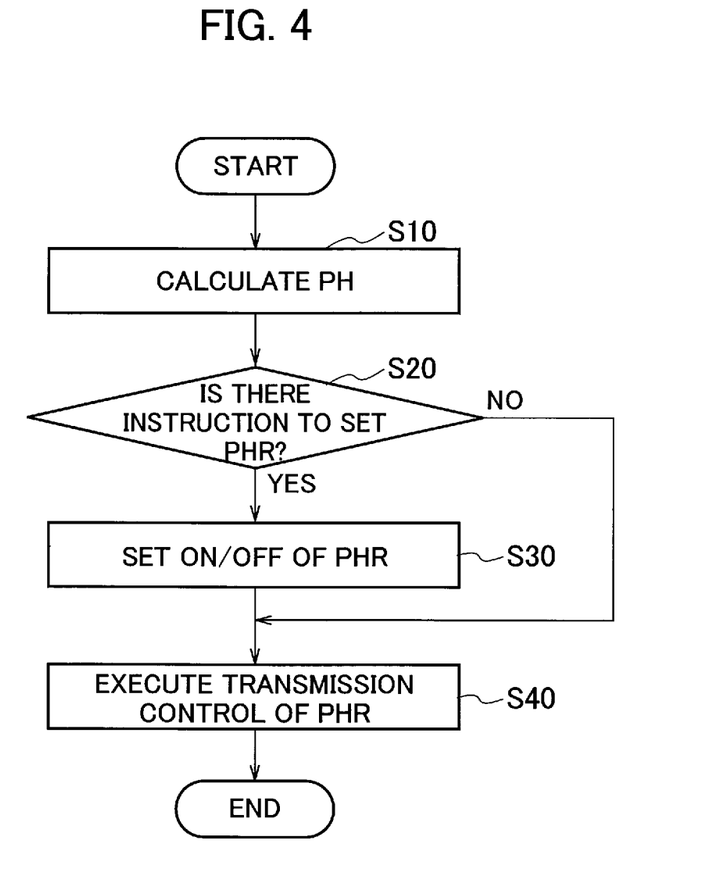
FIG. 4 is a diagram showing a transmission operation flow of PHR by the UE 200.

FIG. 4 shows a flowchart of PHR transmission operation performed by the UE 200. In this operation example, the PHR transmission from the UE 200 can be turned on (transmit) or turned off (stop) for each of the PH types (Type 1 or Type 3). Further, in all of the following operation examples it is assumed that the dual connectivity (for example, EN-DC) in which the eNB 100A and the gNB 100B are used is performed.

As shown in FIG. 4, the UE 200 calculates the PH for the serving cells (LTE cells #1 and #2 and NR cells #1 and #2) (Step S10). As explained above, the Type 1 PH is used for the LTE cell #1 and the NR cell #1. On the other hand, the Type 3 PH is used in the LTE cell #2 and the NR cell #2.

The UE 200 determines whether an instruction indicating the type of PH has been received from the eNB 100A (or the gNB 100B) (Step S20). Each of the radio base stations (eNB 100A and gNB 100B) determines, when they receive the report of the PH of the serving cell formed by other radio base station (that is, the serving cell under the other radio base station), by which of the types of PH the report shall be made.

Upon receiving this instruction, the UE 200 sets the PHR transmission to on (transmit) or off (stop) (Step S30).

The UE 200 transmits only the PHR of one of the types to the eNB 100A (or the gNB 100B) based on the set PHR transmission state (Step S40). That is, basically it is not assumed that both types are turned on at the same time, or both types are turned off at the same time.

The process at Step S20 can be omitted. That is, when the default is set to one of the types, this processing is unnecessary.

Also, in this case, the UE 200 can perform following operation for a certain serving cell for which off (stop) has been set.

(i) not to transmit the PHR for the certain serving cell, or to report an invalid value or a predetermined value (ii) report a value of the PH calculated based on an equation of a predetermined type of PH (for example, always calculate the Type 1 PH)

In the case of (ii), a predetermined value may be applied (a format similar to Virtual PH may be used) for a parameter (for example, a transmission power initial value, TPC command accumulated value, an allocation resource block (RB) number, or an offset based on MCS (Modulation and Coding Scheme) selection) used for calculating the PH).

(3.2) Operation Example 2

Figure 5:
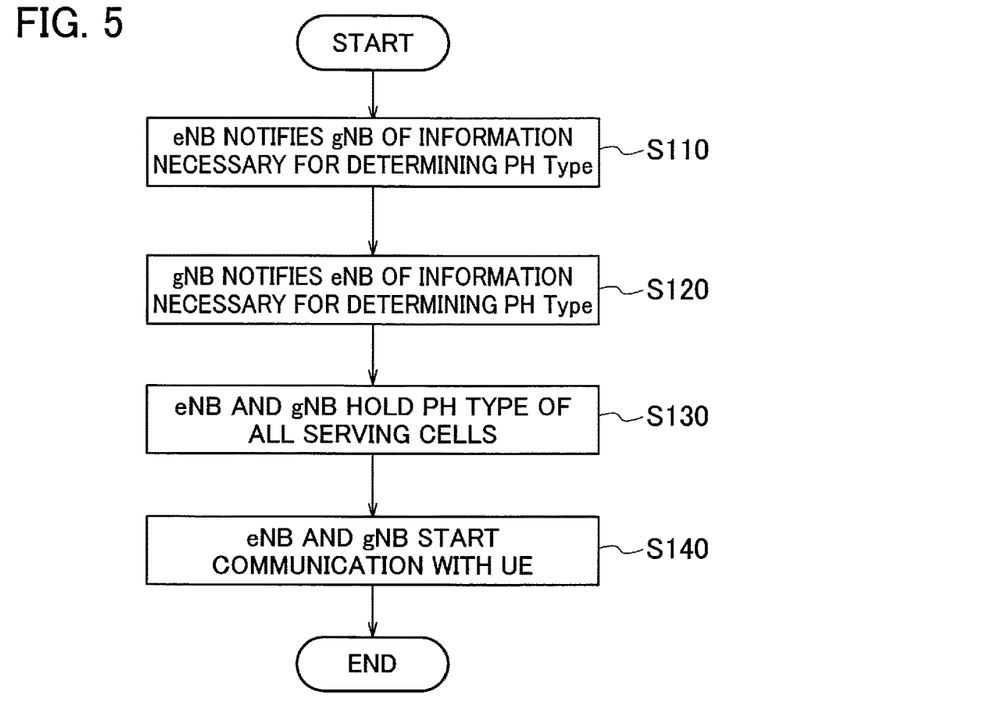
FIG. 5 is a diagram showing a sharing operation flow of PH type (PH Type) by the eNB 100A and gNB 100B.

FIG. 5 shows a sharing operation flow of the PH type (PH Type) performed by the eNB 100A and the gNB 100B. In this operation example, information on the serving cell including the PH Type is mutually notified between the eNB 100A and the gNB 100B.

As shown in FIG. 5, the eNB 100A notifies the gNB 100B of information necessary for determining the PH Type (Step S110). As explained above, the signaling via the X2 interface, the inter-node message (Inter-node message), or the like can be used for notifying this information. Alternatively, this information can be notified via a core network (not-shown), or the UE 200.

Similarly, the gNB 100B notifies the eNB 100A of information necessary for determining the PH Type (Step S120).

The notification can be performed in a unit of a serving cell, the UL, or BWP (Bandwidth Part). As the contents of the notification, an indication that directly specifies the PH Type can be used. Alternatively, it is allowable to indirectly specify the PH Type by specifying such as whether the PUSCH (or PUCCH (Physical Uplink Control Channel) transmission is set or SRS switch is set.

Further, in addition to the contents mentioned above, any information indicating the characteristics of the serving cell, such as Frequency Range (FR1 or FR2), frequency of Power sharing, and the like can be notified.

As a result of the processing at Step S130, the eNB 100A and the gNB 100B hold the PH type of all the serving cells (the LTE cells #1 and #2 and the NR cells #1 and #2) related to dual connectivity with the UE 200 (Step S130).

The eNB 100A and the gNB 100B start communicating with the UE 200 while executing the UL transmission power control based on the PH Type (Step S140).

(3.3) Operation Example 3

Figure 6:
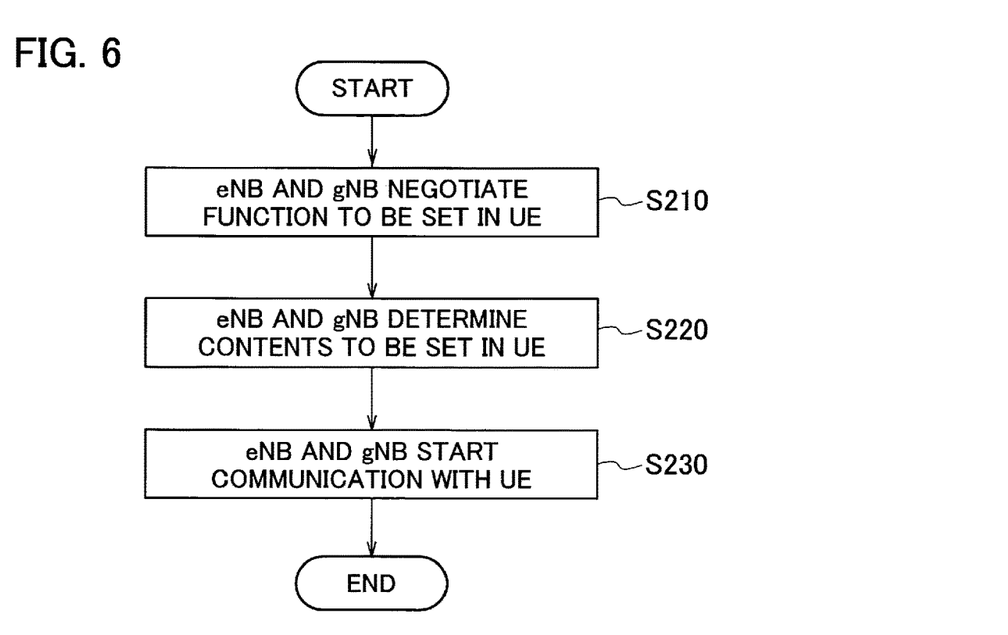
FIG. 6 is a diagram showing a negotiation operation flow relating to a setting function to the UE 200 by the eNB 100A and the gNB 100B.

FIG. 6 shows a negotiation operation flow relating to a setting function to the UE 200 performed by the eNB 100A and the gNB 100B. In this operation example, negotiation relating to the setting function to the UE 200 is performed between the eNB 100A and the gNB 100B. As a result, the eNB 100A and the gNB 100B can recognize the PH Type in each of the serving cells.

As shown in FIG. 6, the eNB 100A and the gNB 100B negotiate the function to be set in the UE 200 (Step S210). For this negotiation, the signaling via the X2 interface, the inter-node message (Inter-node message) , or the like can be used. Alternatively, this information can be notified via a core network (not-shown), or the UE 200.

Specifically, the eNB 100A and the gNB 100B determine setting information of the function of the UE 200 while recognizing the functions to be mutually set.

For example, a radio base station that does not want to receive the Type 3 PH (for example, because it does not support a certain function), notifies the other radio base station that it does not support the certain function. Alternatively, a radio base station that does not want to receive the Type 3 PH can request the other radio base station not to set the corresponding function (for example, the SRS switch). Such a request can be notified in SN (Secondary Node) addition procedure.

By such negotiation, the eNB 100A and the gNB 100B determine contents to be set in the UE 200 (Step S220). As a result, the eNB 100A and the gNB 100B can recognize the PH Type in each of the serving cells.

The eNB 100A and the gNB 100B start communicating with the UE 200 while executing the UL transmission power control based on the PH Type (Step S230).

(4) Advantageous Effects

With the above-described embodiment, the following advantageous effects can be obtained. Specifically, as explained in Operation Example 1, the UE 200 can control the transmission or the stop of transmission of the uplink transmission related information of the predetermined type (Type 1 or Type 3).

Therefore, even when the dual connectivity (DC) is set, the eNB 100A (gNB 100B) need not acquire the setting information of other radio base station from time-to-time, but still can easily and quickly recognize the uplink transmission related information of all the serving cells that are the target of the DC.

This makes it possible to avoid inconsistency in the PH Type between the UE 200 and the eNB 100A or the gNB 100B. Furthermore, because it is not necessary to acquire the setting information of other radio base station from time-to-time, it is also possible to avoid degradation of the interoperability between the radio base stations.

Particularly, in the present embodiment, the UE 200 can control the transmission or the stop of transmission of the power headroom report (PHR). Therefore, the PH Type can be easily and quickly recognized for all the serving cells subject to the DC.

In the present embodiment, the UE 200 can control the transmission or the stop of transmission of the PHR based on the PH Type received from the eNB 100A (or the gNB 100B). Accordingly, it is possible to flexibly change the transmission or the stop of transmission of the PHR under the initiative of the network.

In the present embodiment, as explained in Operation Example 2, the eNB 100A can transmit, to the gNB 100B (other radio base station) that performs the dual connectivity with the UE 200, the information used for setting the uplink transmission related information. Moreover, as explained in Operation Example 3, it is possible to perform the negotiation between the eNB 100A and the gNB 100B regarding the setting function to the UE 200.

Accordingly, the eNB 100A and the gNB 100B can recognize the PH Type in each of the serving cells. Also, similarly, it is possible to avoid the inconsistency of the PH Type and the degradation of the interoperability between radio base stations.

(5) Other Embodiment

Although the contents of the present invention have been described by using the embodiments, it is obvious to those skilled in the art that the present invention is not limited to what is written here and that various modifications and improvements thereof are possible.

For example, the unit by which the operation flows explained in Operation Examples 1 to 3 are applied may be appropriately changed. Concretely, the unit can be per UE, per cell group (including CG of DC or PUCCH group), per frequency, per (frequency) band, per FR (FR1, FR2), per serving cell, per type of UL (normal UL, SUL), and BWP unit.

Furthermore, in any of the above operation examples, an identifier (e.g., Serving cell Index, SCell Index, UL index, BWP index) according to a notification or a setting unit can be notified simultaneously.

Also, in any of the above operation examples, when the PH Type is uniquely determined, the notification or the setting relating to the uplink transmission related information can be omitted as appropriate.

For example, in Primary SCell (PCell) or Primary SCell (PSCell), because the PUSCH is always set, the PH Type can be determined uniquely. Also, in DL only serving cell, the PH itself is not notified (PHR is not transmitted). Further, when the notification or the setting is omitted, the notification or the setting may not be simply performed, or it may be notified that the same is omitted.

In the above embodiments, the explanation is given by taking the PH Type as an example. However, similar control can be applied to any information element (IE) and setting contents (e.g., FR1, FR2, etc.) for which, unless the setting information of the other radio base station is acquired from time-to-time between the radio base stations, a recognition mismatch will occur between the UE 200 and the eNB 100A or the gNB 100B.

Furthermore, Operation Example 1 can be additionally performed as needed based on the results of Operation Example 2 or Operation Example 3. In Operation Example 2 and Operation Example 3, the notification or negotiation can be performed between radio base stations (nodes) . Alternatively, a specific node can function as an anchor node and notify the other nodes of information necessary.

Note that, as in Central Unit (CU)-Distributed Unit (DU) split that uses F1 interface and Control Plane (CP)-User Plane (UP) separation that uses E1 interface, when the node that manages the radio resource control layer (RRC) and the node that manages the PHR are different, the above-described operation can be applied between the nodes.

In the above embodiments, the explanation is given by taking the EN-DC as an example. However, the above operation examples can be generally applied to the dual connectivity such as LTE-LTE DC, NR-NR DC, etc.

Moreover, the block diagrams used for explaining the embodiments (FIGS. 2 and 3) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 7:
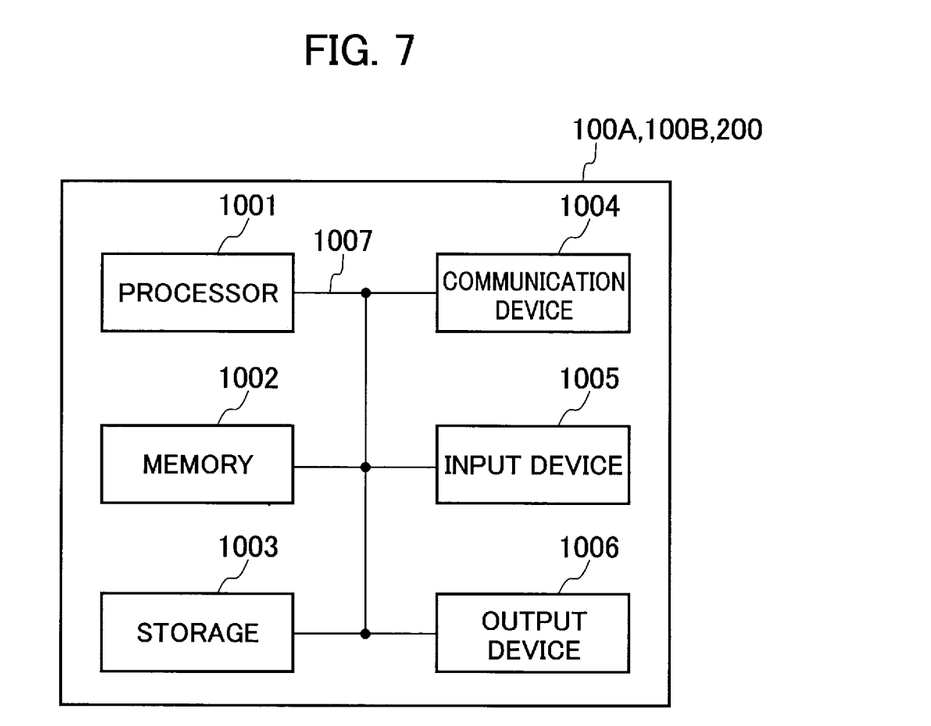
FIG. 7 is a diagram illustrating an example of a hardware configuration of the eNB 100A (gNB 100B) and the UE 200.

Furthermore, the eNB 100A (gNB 100B) and the UE 200 (devices) explained above can function as a computer that performs the processing of the present invention. FIG. 7 is a diagram showing an example of a hardware configuration of these devices. As shown in FIG. 7, each of these devices can be configured as a computer device including a processor 1001, a memory 1002, a storage 1003, a communication device 1004, an input device 1005, an output device 1006, a bus 1007, and the like.

The functional blocks of the devices (see FIGS. 2 and 3) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory) , and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called RRC message, and the RRC signaling can be, for example, RRC Connection Setup message, RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (gNB 100B, same holds true in the below explanation) can be performed by another network node (device). Moreover, functions of the eNB 100A can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

As explained above, the present invention is useful because, in the dual connectivity (DC), a radio base station can recognize uplink transmission related information such as power headroom (PH) of all serving cells while avoiding degradation of interoperability between radio base stations.

EXPLANATION OF REFERENCE NUMERALS 10 radio communication system
100A eNB
100B gNB
110 transmitting unit
120 receiving unit
130 control unit
200 UE
210 transmitting unit
220 receiving unit
230 control unit
1001 processor
1002 memory
1003 storage
1004 communication device
1005 input device
1006 output device
1007 bus

The invention claimed is:

1. A terminal that performs radio communication with a base station and supports dual connectivity in which the terminal simultaneously connects to the base station and another base station with a different communication system from the base station, the terminal comprising:
- a transmitter that transmits to the base station and the another base station a report of power headroom of the terminal; and
- a processor that omits at least part of transmission of the report of power headroom,
- wherein Type 3 power headroom is applied to the terminal, and
- wherein the omitted part of the transmission of the report comprises a notification of information regarding a type of power headroom.

\* \* \* \* \*